US010086743B2

(12) United States Patent
Rovison, Jr. et al.

(10) Patent No.: US 10,086,743 B2
(45) Date of Patent: Oct. 2, 2018

(54) TRAILER AND METHOD FOR TRANSPORTING PERACETIC ACID

(71) Applicant: PeroxyChem LLC, Philadelphia, PA (US)

(72) Inventors: John M. Rovison, Jr., Sanborn, NY (US); James Brennan, Williamsville, NY (US)

(73) Assignee: PEROXYCHEM LLC, Philadelphia, PA (US)

( * ) Notice: Subject to any disclaimer, the term of this patent is extended or adjusted under 35 U.S.C. 154(b) by 51 days.

(21) Appl. No.: 14/019,696

(22) Filed: Sep. 6, 2013

(65) Prior Publication Data

US 2014/0131975 A1 May 15, 2014

Related U.S. Application Data

(60) Provisional application No. 61/726,297, filed on Nov. 14, 2012.

(51) Int. Cl.
*B60P 3/22* (2006.01)
*B65D 85/12* (2006.01)
*B65D 90/34* (2006.01)

(52) U.S. Cl.
CPC ............ *B60P 3/225* (2013.01); *B60P 3/2255* (2013.01)

(58) Field of Classification Search
CPC ........ B65D 85/84; B65D 88/12; B65D 90/32; B65D 90/34; B60P 3/22; B60P 3/225; B60P 3/2255; B62D 33/04
USPC ................ 280/830, 837, 838, 839; 105/358; 220/562–564, 89.1
See application file for complete search history.

(56) References Cited

U.S. PATENT DOCUMENTS

| 2,879,785 | A | * | 3/1959 | Vesterdal | ................ | B60P 3/246 |
| | | | | | | 105/360 |
| 3,158,383 | A | * | 11/1964 | Anderson | ............. | B60P 3/2225 |
| | | | | | | 105/360 |

(Continued)

FOREIGN PATENT DOCUMENTS

| EP | 0 114 709 A1 | 8/1984 |
| EP | 1 820 750 A2 | 8/2007 |

(Continued)

OTHER PUBLICATIONS

WHitesides, Randall, "Selection and Sizing of Pressure Relief Valves", 2012, PDH Online.*

(Continued)

*Primary Examiner* — Anne Marie M Boehler
(74) *Attorney, Agent, or Firm* — Duane Morris LLP

(57) ABSTRACT

A trailer for transporting a liquid mixture having at least about 5% peracetic acid by weight includes a stainless steel tank having an external spill containment enclosure and a predetermined maximum allowable working pressure. One or more pressure relief valves are included in a wall of the tank within the external spill containment enclosure and configured to provide pressure relief to the tank at a pressure of between about 20%-50% of the maximum working pressure of the tank, thereby preventing over-pressurization of a reactive and decomposing fluid during a fire event. Wheels and a kingpin are affixed to the tank to enable transportation over public roadways.

13 Claims, 3 Drawing Sheets

(56) References Cited

U.S. PATENT DOCUMENTS

| | | | | |
|---|---|---|---|---|
| 3,280,301 | A * | 10/1966 | Nelson | B60P 3/2295 105/358 |
| 3,625,137 | A * | 12/1971 | Johnson | B60P 3/2255 280/837 |
| 3,883,148 | A * | 5/1975 | Miller | B65D 88/26 105/358 |
| 4,673,102 | A * | 6/1987 | Bullock, Jr. | B60P 3/2205 220/562 |
| 4,940,256 | A * | 7/1990 | Jordan, III | B60P 3/2205 280/837 |
| 6,893,862 | B1 * | 5/2005 | Horn | B01F 3/06 435/243 |
| 7,849,801 | B2 | 12/2010 | Dalrymple et al. | |
| 8,328,040 | B2 * | 12/2012 | Ries | B65D 88/12 220/562 |
| 8,575,075 | B2 * | 11/2013 | Huang | C09K 8/685 166/305.1 |
| 8,827,313 | B2 * | 9/2014 | Haut | B62D 21/20 206/503 |
| 2003/0146616 | A1 * | 8/2003 | Twomey | B60P 3/426 280/830 |
| 2008/0087665 | A1 * | 4/2008 | Rummel | B65D 88/128 220/1.5 |
| 2010/0160449 | A1 * | 6/2010 | Rovison, Jr. | A01N 37/02 514/714 |
| 2013/0328298 | A1 * | 12/2013 | Thomas | B60P 3/221 280/837 |
| 2014/0128297 | A1 * | 5/2014 | Conrad | C02F 1/50 507/267 |
| 2014/0210197 | A1 * | 7/2014 | Girard | B60P 3/226 280/837 |

FOREIGN PATENT DOCUMENTS

| | | |
|---|---|---|
| GB | 832039 A | 4/1960 |
| RU | 2 211 157 C2 | 8/2003 |

OTHER PUBLICATIONS

Fauske, H.K., "Emergency Relief Systems (ERS) Design," Chemical Engineering Progress, pp. 53-56 (Aug. 1985).

Fauske, H.K., and Leung, J.C., "New Experimental Technique for Characterizing Runaway Chemical Reactions, " Chemical Engineering Progress, vol. 81, No. 8, pp. 39-46 (Aug. 1985).

Leung, J.C. and Fauske, H.K., "Runaway System Characterization and Vent Sizing Based on DIERS Methodology, "Plant Operations Progress, vol. 6, No. 2, pp. 77-83 (Apr. 1987).

Leung, J.C., Fauske, H.K., and Fisher, H.G., "Thermal Runaway Reactions in a Low Thermal Inertia Apparatus," Thermochimica Acta, 104, pp. 13-29 (1986).

Fauske, H.K., "Flashing Flows or: Some Practical Guidelines for Emergency Releases," Plant/Operations Progress 4(3), p. 133 (1985).

Fauske, H.K., "Properly Size Vents for Nonreactive and Reactive Chemicals," Chem. Eng. Progress (Feb. 2000).

Fauske, H.K., "A Practical Approach to Capacity Certification," www.chemicalprocessing.com (Feb. 2003).

Fauske, H.K., "A Safe and Practical Approach to Relief Sizing for Tempered Hybrid Reactions," DIERS Users Group Meeting, Las Vegas, NV (May 2, 2006).

* cited by examiner

TRAILER AND METHOD FOR TRANSPORTING PERACETIC ACID

BACKGROUND OF THE INVENTION

1. Field of the Invention

The field of the present invention is vessels used for and methods of transporting peracetic acid.

2. Background

Hazardous materials in the liquid state are often transported in stainless steel containers, particularly 316 stainless, because stainless steel is inert to many such hazardous materials. The Department of Transportation (DOT) regulates all such shipments to ensure public roadway safety, and the type of regulatory restrictions vary depending upon the hazardous nature of the liquid being transported.

For example, 49 C.F.R. 173.225 sets forth packaging requirements for organic peroxides, and indicates that a DOT-412 cargo tank may be used for transporting certain organic peroxides. The DOT-412 cargo tank has a nominal capacity of 5000 gallons, and is constructed according to the requirements set forth in 37 CFR 178.320, 178.345.,and 178.348.,the design specifications of which are incorporated herein by reference in their entirety. However, the DOT-412 cargo tank is not authorized for transporting peracetic acid, as this Type F organic peroxide, ID No. UN 3109 (as listed in 37 C.F.R. 172.101) is limited to a bulk containers having a capacity of up to 1,500 liters (396 gallons).

Requirements for the DOT-412 cargo tank include a 316 stainless steel container having a maximum allowable working pressure (MAWP) of not more than 40 psig and a resealable pressure relief system. According to regulations, the pressure relief system on a DOT-412 cargo tank is to have a set pressure to provide pressure relief at between 120%-132% of the MAWP and a minimum venting capacity based upon the exposed area of the cargo tank, which is typically provided by one 3" reclosing pressure relief valve. The intent of these regulations is to equip the DOT-412 cargo tank with a sufficient size and quantity of pressure relief devices so that an increase in pressure of the cargo tank, whether due to a self-accelerating decomposition or fire engulfment, would not result in a rupture of the cargo tank.

The DOT can make exceptions to the regulations for the transport of hazardous materials over public roadways on a case-by-case basis. As one example, Azko Nobel Polymer Chemicals, LLC, of Chicago, Ill., has obtained an exemption for the transport of two types of Type F liquid organic peroxides, ID Nos. UN3109 and UN3119, both in Packing Group II, in a modified DOT-412 cargo tank. The modifications leading to approval of this special permit by the DOT include installation of six 12" diameter non-reclosing pressure relief devices (in the form of rupture discs) as a single unit without being installed in series with a reclosing pressure relief device.

Due to the hazardous nature of the organic peroxide subject to the Azko exemption, which is more reactive than peracetic acid, which is also a Type F liquid organic peroxide, ID No. UN3109.,Packing Group II, and the increased risk of decomposition event if transferred in a standard DOT-412 cargo tank, the solution arrived at for the Azko special permit was to increase the overall pressure relief area to about 340 in². Although peracetic acid would not likely require as much pressure relief area as specified in the Azko special permit, a significantly large pressure relief area would be required. In view of the large pressure relief area required, a different solution has been sought for a cargo tank to transport peracetic acid, one which could also be implemented by modifying a DOT-412 cargo tank, and one which would also meet the DOT goals of having pressure relief devices of a sufficient size and quantity so that an increase in pressure of the cargo tank, whether due to a self-accelerating decomposition or fire engulfment, would not result in a rupture of the cargo tank.

SUMMARY OF THE INVENTION

The present invention is directed toward a trailer and a method or design tactic for transporting a liquid mixture having at least about 5% peracetic acid by weight. A stainless steel tank has an external spill containment enclosure and a predetermined maximum allowable working pressure. Wheels and a kingpin are affixed to the tank. One or more pressure relief valves are included in the wall of the tank within the spill containment enclosure, wherein the one or more pressure relief valves are configured to provide pressure relief to the tank at a pressure of between about 20%-50% of the maximum allowable working pressure of the tank. Preferably, the pressure relief valves are configured to prevent internal pressure within the tank from exceeding a maximum pressure during a decomposition event or fire engulfment, thereby preventing over-pressurization of a reactive and decomposing fluid during a fire event. The pressure relief valves may have a pressure relief area greater or equal to 11.94 in², and they may be configured to provide pressure relief when a pressure inside the tank exceeds about 10 psig. Other combinations of set pressures and pressure relief areas may also be used. With such a trailer provided, the tank may be filled with a liquid mixture having at least about 5% peracetic acid by weight and transported over public roadways.

Accordingly, an improved trailer and method for transporting peracetic acid are disclosed. Advantages of the improvements will be apparent from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
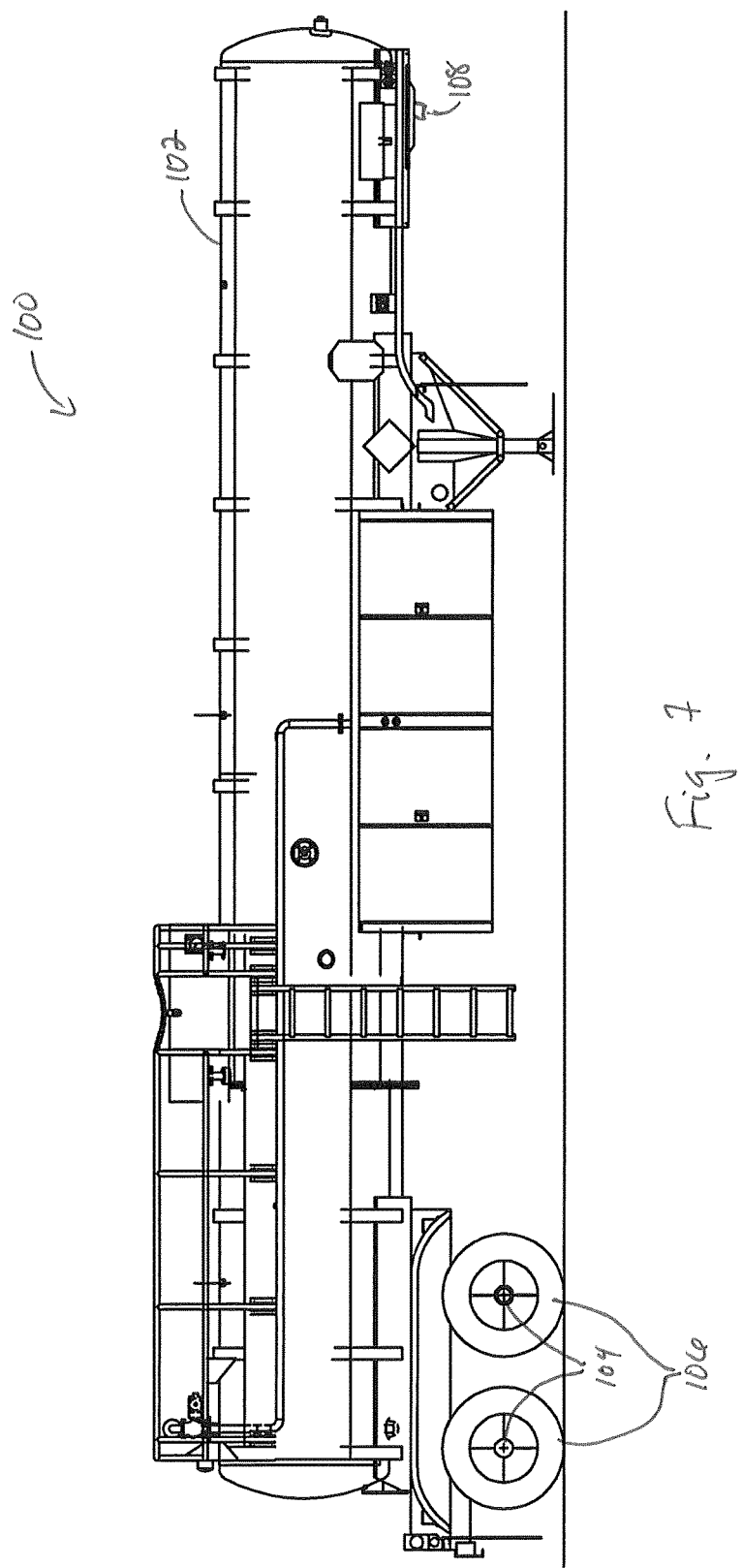
FIG. 1 illustrates a trailer configured to transport peracetic acid.

Turning in detail to the drawings, FIG. 1 illustrates a trailer 100 configured for transporting a liquid mixture (shown implicitly inside the tank) having at least about 5% peracetic acid by weight. Although many different concentrations of peracetic acid may be transported using the trailer, the ensuing description will discuss the trailer in the context of transporting UN3109.,nominal 15% peracetic acid/10% hydrogen peroxide (referred to as PAA below), which is a liquid organic peroxide of Type F, in Product Group II.

The trailer 100 has a stainless steel tank 102, to which is affixed dual axels 104 and associated wheels 106, and a kingpin 108 for securing the trailer 100 to a motorized rig (not shown) for transportation over public roadways. Except for the modifications described below, the trailer is constructed in conformance with the DOT-412 cargo tank requirements of set forth in 37 CFR 178.320, 178.345, and 178.348. Thus, the trailer may be constructed new with modifications to the manufacturing specifications, or it may be constructed by modifying an existing DOT-412 cargo tank. Following are the modifications made to an existing DOT-412 cargo tank to obtain the trailer 100 depicted in the figures.

Figure 2:
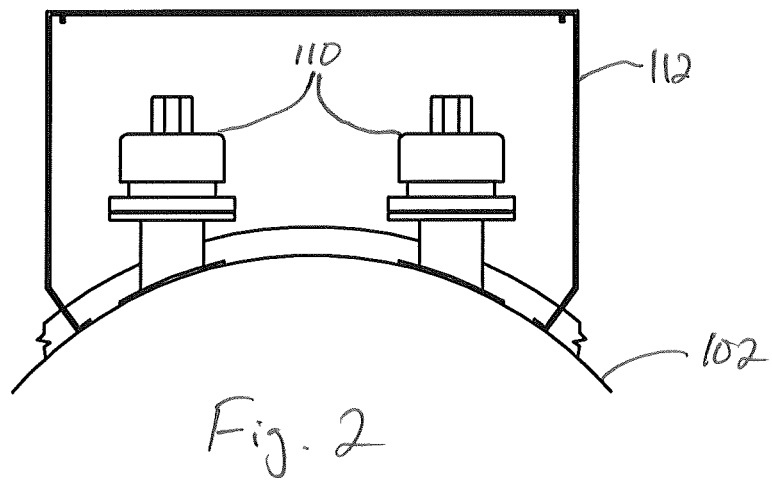
FIG. 2 illustrates pressure relief valves for the trailer of FIG. 1.

The existing pressure relief valve (or rupture disk on older cargo tanks) of a standard DOT-412 cargo tank is removed, as is the ceramic breather vent. Two recloseable 4" diameter pressure relief valves 110 are installed in the side wall of the tank 102, as shown in FIG. 2. The two pressure relief valves 110 preferably conform with applicable DOT requirements under 37 CFR 178.345, and they have set pressure of 10 psig. They also provide a total pressure relief area of 13.65 in$^2$. An external spill containment enclosure 112 is placed on the outside of the tank 102 around the two pressure relief valves 110. This enclosure 112 prevents release of PAA onto the roadway in the event the pressure relief valves 110 activate in transit. Moreover, the combination of the pressure relief valves 110 and the enclosure 112 are anticipated to significantly contain discharge of PAA into the environment, even in the event of a rollover, thereby preventing overpressurization of a reactive and decomposing fluid during a fire event. The enclosure 112 may also include internal splash baffles (not shown) to minimize PAA entrainment if/when the pressure relief valves 110 activate.

It has been determined that with PAA in a transport container, the internal pressure of the container will generally be in the range of about 5 psig to 10 psig during transit. The 10 psig set pressure of the pressure relief valve, or valves, is therefore sufficient to prevent PAA leakage during normal transport conditions. Further, through experimentation, it has been determined that with a set pressure of 10 psig, a total pressure relief area of 11.94 in$^2$ is sufficient to prevent internal pressure within the tank from exceeding the maximum tank pressure during a decomposition event or fire engulfment. Specifically, for PAA, the self-accelerating decomposition temperature in a DOT-412 cargo tank has been calculated to be 61° C. Liquids with lower amounts of peracetic acid are anticipated to have a higher self-accelerating decomposition temperature. With the two recloseable 4" diameter pressure relief valves 110 installed, it has been calculated that tank pressurization would be limited to no more than 42.2 psig during a decomposition event or fire engulfment.

At a set pressure of 44 psig, the calculated pressure relief area is 20.5 in$^2$ for PAA in a DOT-412 cargo tank. Although calculations of pressure relief area have not been performed for other set pressures, it is anticipated that the relationship between set pressure and pressure relief area is somewhat close to being linear for PAA in a DOT-412 cargo tank. Therefore, even with these two data points (10 psig, 44 psig), the calculations show that PAA can be contained, and internal pressure within the tank can be prevented from exceeding the maximum pressure of the tank during a decomposition event or fire engulfment, even when pressure relief valves having a pressure of 50% or less of the MWAP of the tank are used.

Figure 3:
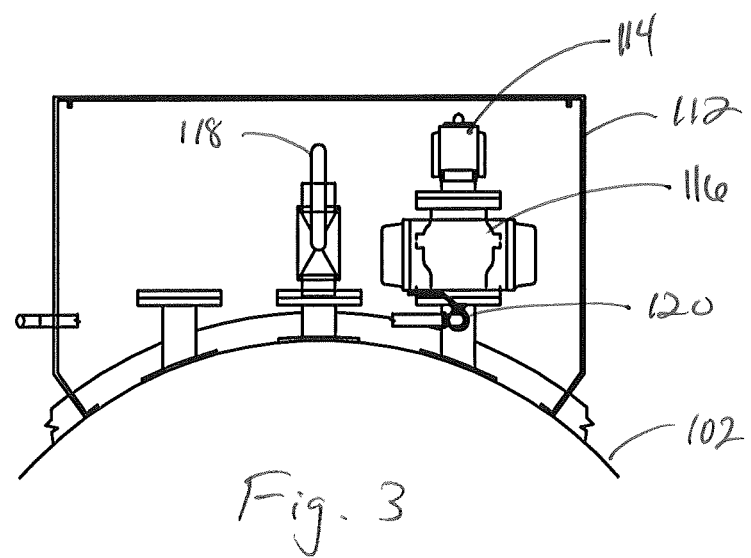
FIG. 3 illustrates additional valves and returns for the trailer of FIG. 1.

A quick connect coupling 114 and a valve 116 are added to the tank 102 within the enclosure 112, as shown in FIG. 3, along with a vapor return 118. The quick connect coupling 114 and the valve 116 enable the tank to be filled with PAA, and the vapor return 118 provides a vapor outlet from a storage tank into which the PAA is unloaded.

Figure 4:
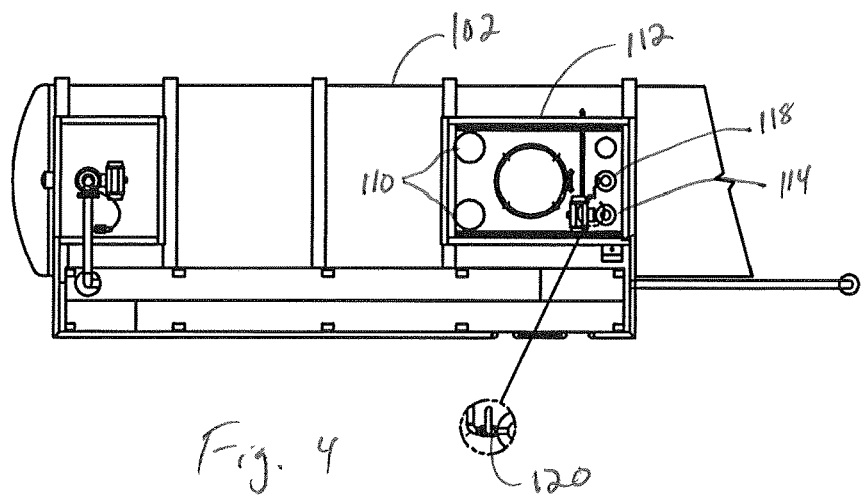
FIG. 4 is a partial top elevation view of the trailer of FIG. 1.

The tank 102 is also fitted with a manual bleed-off valve 120 within the enclosure 112, as shown in FIGS. 3 & 4. This bleed-off valve 120 enables the internal tank pressure to be vented prior to offloading. In addition, the bleed-off valve 120 may be equipped with a suitable capture device to minimize operator exposure to PAA fumes when the tank is vented.

Gauges (not shown in the figures) to monitor the internal pressure, temperature, and level of the tank should be added to the trailer. The first two gauges enable the operator to monitor the internal pressure and temperature of the tank during transit, and the level gauge allows the operator to determine when loading and unloading operations are completed, since due to the hazardous nature of PAA, visual inspection of the tank is not an option.

Figure 5:
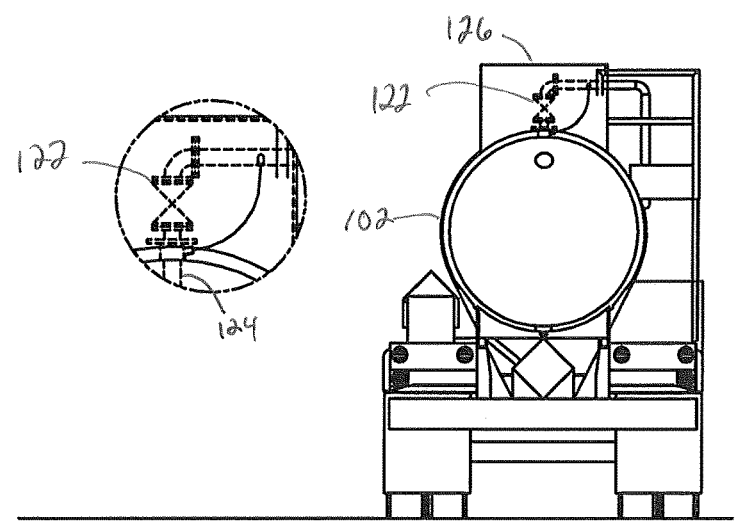
FIG. 5 is a rear view of the trailer of FIG. 1.

As shown in FIG. 5, a valve 122 is installed at the top of the dip pipe 124, through which PAA is drawn by the unloading pump not shown. A second spill containment enclosure 126 may be constructed about the valve 122 at the rear of the trailer. A small pressure relief valve (not shown) may also be installed Immediately upstream of the valve 122 to prevent PAA from being trapped during unloading, and a locking vented dust cap (not shown) may be installed at the discharge of the unloading pump. These additions to the inlet and discharge of the unloading pump, while optional, are intended to provide additional protection against siphoning of PAA through the trailer discharge line during transit, in the event that the valve 122 is left open or fails in the open position.

Finally, the discharge of the existing siphon break (not shown) on the unloading line is routed back to vapor space within the tank to prevent release of PAA into the environment in the event the siphon valve is left open.

By making the above modifications to the standard DOT-412 cargo tank, it is anticipated that PAA may be transported safely in greater quantities than the presently-allowed 1,500 liters (396 gallons) maximum. The transport of greater quantities would allow greater demands for PAA to be met. For example, PAA is being used increasingly as a microbial control agent by direct applications on meats, in aseptic packaging, and in oil and gas field applications. The bulk transportation of PAA also means less handling of the hazardous material during filling, transportation, and offloading. Finally, it is anticipated that the proposed modified DOT-412 cargo tank would be as safe, or safer, than containers which meet current regulations.

Thus, a trailer and method for transporting peracetic acid are disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A trailer for transporting a liquid mixture having at least 5% peracetic acid by weight, the trailer comprising: a stainless steel tank having an external spill containment enclosure and a predetermined maximum allowable working pressure associated with the stainless steel tank; one or more pressure relief valves included in a wall of the tank within the external spill containment enclosure, wherein the one or more pressure relief valves are configured to provide pressure relief to the tank at a pressure between 20% and 50% of the maximum allowable working pressure of the stainless steel tank and wherein the one or more pressure relief valves are reclosing pressure relief valves, and wherein the one or more reclosing pressure relief valves are configured to provide pressure relief when an internal pressure inside the stainless steel tank exceeds 10 psig, and wherein a relief area of the one or more reclosing pressure relief valves is configured to prevent the internal pressure within the stainless steel tank from exceeding a maximum pressure associated with the stainless steel tank during a decomposition event; and wheels and a kingpin affixed to the stainless steel tank.

2. The trailer of claim 1, wherein the maximum allowable working pressure is about 40 psig.

3. The trailer of claim 1, wherein the one or more reclosing pressure relief valves have a combined relief area greater or equal to 11.94 in$^2$.

4. The trailer of claim 1, wherein a relief area of the one or more reclosing pressure relief valves are configured to prevent the internal pressure within the stainless steel tank from exceeding the maximum pressure during fire engulfment.

5. The trailer of claim 1, wherein the one or more reclosing pressure relief valves includes two 4" diameter reclosing pressure relief valves, each configured to provide pressure relief to the stainless steel tank at 10 psig.

6. The trailer of claim 1, wherein the configuration of the one or more reclosing pressure relief valves is sufficient to prevent peracetic acid leakage.

7. A combination comprising: a liquid mixture having at least 5% peracetic acid by weight; and a trailer for transporting the liquid mixture, the trailer comprising: a stainless steel tank having an external spill containment enclosure and a predetermined maximum allowable working pressure associated with the stainless steel tank; one or more pressure relief valves included in a wall of the stainless steel tank within the external spill containment enclosure, wherein the one or more pressure relief valves are configured to provide pressure relief to the stainless steel tank at a pressure between 20% and 50% of the maximum allowable working pressure of the stainless steel tank and wherein the one or more pressure relief valves are reclosing pressure relief valves, wherein the one or more reclosing pressure relief valves are configured to provide pressure relief when an internal pressure inside the stainless steel tank exceeds 10 psig and wherein a relief area of the one or more reclosing pressure relief valves are configured to prevent the internal pressure within the stainless steel tank from exceeding a maximum pressure associated with the stainless steel tank during a decomposition event; and wheels and a kingpin affixed to the tank.

8. The combination of claim 7, wherein the maximum allowable working pressure is about 40 psig.

9. The combination of claim 7, wherein the one or more reclosing pressure relief valves have a combined relief area greater or equal to 11.94 in$^2$.

10. The combination of claim 7, wherein a relief area of the one or more reclosing pressure relief valves are configured to prevent internal pressure within the stainless steel tank from exceeding the maximum pressure during fire engulfment.

11. The combination of claim 7, wherein the one or more reclosing pressure relief valves includes two 4" diameter pressure relief valves, each configured to provide pressure relief to the stainless steel tank at −10 psig.

12. The combination of claim 7, wherein the configuration of the one or more reclosing pressure relief valves is sufficient to prevent peracetic acid leakage.

13. A trailer for transporting a liquid mixture having at least 5% peracetic acid by weight, the trailer comprising:
a stainless steel tank having an external spill containment enclosure and a predetermined maximum allowable working pressure associated with the stainless steel tank;
one or more pressure relief valves included in a wall of the stainless steel tank within the external spill containment enclosure, wherein the one or more pressure relief valves are configured to provide pressure relief to the stainless steel tank at a pressure between 20% and 50% of the maximum allowable working pressure of the stainless steel tank and wherein the one or more pressure relief valves are reclosing pressure relief valves, and wherein the one or more reclosing pressure relief valves are configured to provide pressure relief when an internal pressure inside the stainless steel tank exceeds 10 psig, and wherein a relief area of the one or more reclosing pressure relief valves is configured to prevent the internal pressure within the stainless steel tank from exceeding a maximum pressure during a decomposition event;
and wherein the enclosure further comprises a quick connect coupling, a vapor return and a manual bleed-off valve; and
wheels and a kingpin affixed to the tank.

* * * * *